United States Patent
Frania et al.

[15] 3,690,421
[45] Sept. 12, 1972

[54] AUTOMATIC SINGLE-ACTING SLACK ADJUSTER FOR BRAKE ROD LINKAGE

[72] Inventors: Josef Frania, Hannover; Erhard Lehnert, Dollbergen, Kries Burgdorf, both of Germany

[73] Assignee: Westinghouse Bremsen-und Apparatebau G.m.b.H., Hannover, Germany

[22] Filed: April 8, 1971

[21] Appl. No.: 132,363

[30] Foreign Application Priority Data

May 30, 1970 Germany..........P 20 26 543.4

[52] U.S. Cl..................188/203, 188/59, 188/196 D
[51] Int. Cl..............................................F16d 65/56
[58] Field of Search.............188/59, 196 D, 202, 203

[56] References Cited

UNITED STATES PATENTS 3,334,707  8/1967  Easton......................188/59
3,430,739  3/1969  Persson et al...............188/202
3,572,475  3/1971  Persson et al...............188/202
3,589,480  6/1971  Axelsson et al............188/203

*Primary Examiner*—Duane A. Reger
*Attorney*—Ralph W. McIntire, Jr.

[57] ABSTRACT

The invention concerns itself with an automatically operative and simple operating slack adjuster arrangement for brake rigging for vehicles, especially railway vehicles. It consists of a tubular-shaped body that is axially guided in a fixed housing and in comparison to this cannot be rotated. The tubular body supports thereon two conical clutch surfaces by which, through the means of the aid nut and the clutch nut, the brake as well as respectively the release travel as well as in working conjunction with the contact that is arranged in the fixed housing, the slack adjusting is transferred to the coaxially unrotatable threaded spindle.

11 Claims, 2 Drawing Figures

PATENTED SEP 12 1972 3,690,421

INVENTOR.
JOSEF FRANIA
ERHARD LEHNERT
BY Ralph W. McIntire, Jr.
ATTORNEY

AUTOMATIC SINGLE-ACTING SLACK ADJUSTER FOR BRAKE ROD LINKAGE

The present invention concerns itself with the slack adjuster arrangement of the type which has the clutch nut that is equipped with inside and outside threads whereby its inner thread is in engagement with the thread on a spindle and its outer thread is in engagement with the inner thread of the aid nut. Both sets of threads are of the non-self-locking type and have the same pitch and the same direction of rotation.

The purpose of this invention is to shorten the construction or overall length of the slack adjuster arrangement and to improve its accessibility, for an example, for the purpose of activating a return adjustment arrangement as well as respectively to improve the device that indicates the maximum permissible brake shoe wear.

This purpose is solved thereby in accordance with the conditions of the invention so that the tubular body can be displaced by the means of a member of the brake rigging that is movable relative to the housing.

In the practical manner, the tubular body is linked onto the brake lever that is pivotally mounted on the housing.

In an additional advantageous design set up of the invention, there is provided in the practical manner an annular disc that is spring loaded by the means of springs that are arcuately arranged in a distributed manner around the circumference of the disc which is provided with a clutch surface that is pressed by the springs against a clutch surface on the aid nut. This disc is arranged to be movable axially relative to the thrust body by the means of the axially symmetrically arranged guiding studs subsequent to movement of the studs into contact with a stop. However, this disc is guided so that it cannot be rotated, whereby the axis of the guiding studs lie in the plane in which the longitudinal axis of the tubular body also lies.

In accordance with an additional characteristic of the invention, the threaded spindle is guided out of the housing and can be rotated by the means of an appropriate type tool whereby the threaded spindle is connected with the bearing piece for an additional member of the brake rigging, through the means of the clutch that is built up in the practical manner as a spiral jaw clutch, so that it cannot be moved, however, it is connected so that it can be rotated with the overcoming of the coupling.

Therethrough, the return positioning arrangement is simplified.

It is further provided in accordance with the invention that in the practical manner, on the opposite side of the slack adjuster arrangement of the end of the threaded spindle that is guided out from the housing, there is arranged the control device that is activated by the means of the threaded spindle and, which is arranged for the indicating device that designates the maximum permissible brake shoe wear, whereby the control device can be activated by the means of the spring loaded activating stud that can be moved axially in the threaded spindle and which can be in an unmovable manner connected to the threaded spindle by the means of the contact arranged on this when the maximum permissible brake shoe wear has been attained. Therefore, a simple and space saving activation is attained for the device that designates the maximum permissible brake shoe wear.

A typical design in accordance with the conditions of the invention is illustrated in the drawing in a schematic manner.

Figure 1:
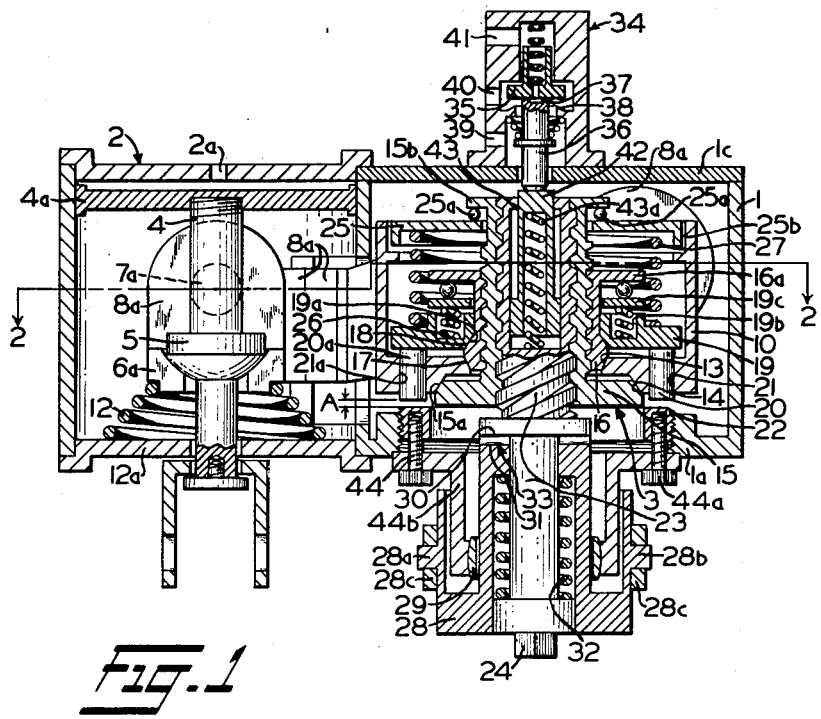
FIG. 1 shows a lengthwise sectional view of a brake assembly for the disc brake of a railway vehicle with the automatic slack adjuster arranged in accordance with the invention.
Figure 2:
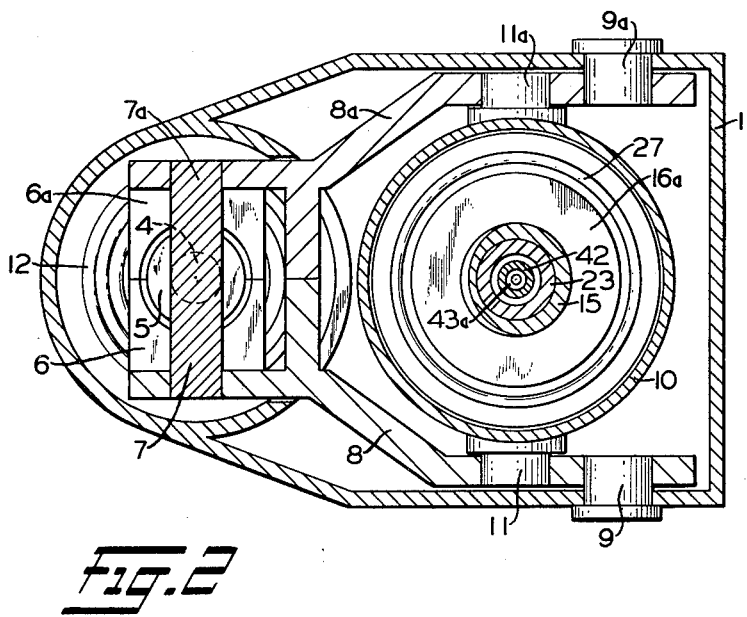
FIG. 2 shows a cross-sectional view through the brake unit taken along the line 2—2 in FIG. 1.

The brake assembly shown in FIGS. 1 and 2 shows a housing 1 in which, in accordance with the present invention, a brake cylinder 2 and a slack adjuster mechanism 3 are disposed with their axes arranged in spaced-apart parallel relationship. A piston rod 4 is provided at its upper end with screw threads by which it is secured to a brake cylinder piston 4a. The piston rod 4 has formed integral therewith intermediate the ends thereof a collar 5 that has at its lower end a spherical surface against which a corresponding spherical surface formed on a two-part socket member 6, 6a (FIG. 2) is biased by a spring 12 interposed between this socket member and a non-pressure head 12a. As shown in FIGS. 1 and 2, the piston 4 has formed integral therewith an extending in opposite directions therefrom at a location above the collar 5, as viewed in FIG. 1, a pair of pins 7 and 7a. The respective outer ends of the pins 7 and 7a are disposed in corresponding bores formed in each part of a two-part brake lever 8, 8a adjacent the left-hand end thereof. The parts 6, 6a of the two-part socket member are integral with the left-hand end of the respective brake lever parts 8 and 8a. Adjacent its respective right-hand end, each lever part 8, 8a is provided with a bore to enable it to be rockably mounted on a corresponding headed pin 9, 9a carried by the housing 1, as shown in FIG. 2.

The slack adjuster mechanism 3 comprises a tubular body 10 having secured, as by screw threads (not shown), to its upper end a pair of trunnions or pins 11, 11a which extend in opposite directions therefrom and pass through bores provided in each part 8, 8a of the two-part brake lever so that the body 10 is movable vertically, as viewed in FIG. 1, as this brake lever 8, 8a is rocked about the pins 9, 9a. The lower end of the tubular body 10 has integral therewith an inturned flange on which is formed two oppositely inclined internal conical-shaped clutch faces or surfaces 13 and 14. As shown in FIG. 1, a nut member 16, adjacent its lower end, is provided with a first external conical-shaped clutch face 17 having the same angle of inclination as the internal clutch face 13 and with a second external conical-shaped clutch face 18. A hollow clutch nut member 15 has integral therewith at its lower end an outturned flange on which is formed a third external conical-shaped clutch face 15a having the same angle of inclination as the internal clutch face 14. An annular member or disc 19 is provided with an internal conical-shaped clutch face 19a that has the same angle of inclination as the external clutch face 18 on the nut member 16.

The annular member 19 is provided with a plurality of arcuately-spaced bottomed bores 19b. Interposed between the bottom of each bottomed bore 19b and an annular member 19c is one of a plurality of springs 16, and interposed between the annular member 19c and an outturned flange 16a integral with the upper end of the nut member 16 is a plurality of arcuately arranged balls which constitute a ball bearing. Accordingly, it is apparent from FIG. 1 that the springs 26 are normally effective to bias the internal clutch face 19a on the annular disc 19 into clutching contact with the external clutch face 18 on the nut member 16.

The annular disc 19 can be axially moved, that is vertically in FIG. 2, with respect to the tubular body 10. However, it cannot be rotated with respect to body 10 since a pair of guide pins 20, 20a that are integral with and extend from the low side of annular disc 19 pass through corresponding bores 21, 21a provided in the inturned flange that is integral with body 10.

The lower end of the housing 1 has formed integral therewith an inturned flange 1a that is provided with internal screw threads whereby a contact ring or stop member 22 having external screw threads can be screwed into or out of the housing 1. The stop member 22 is provided with a pair of internally threaded bottomed bores for receiving a pair of cap screws 44, 44a that secure an end cover 44b to the housing 1.

The clutch nut member 15 is provided with an internal non-self-locking type of screw thread which has screw-threaded engagement with an external non-self-locking screw thread formed on a spindle or brake rod 23, the lower end of which extends to the exterior of the housing 1 and is provided with a hexagonal head 24 for receiving a wrench by which the spindle 23 can be rotated to let out slack when installing new brake shoes on the railway car.

The clutch nut member 15 is also provided with an external non-self-locking type of screw thread which has screw-threaded engagement with an internal non-self-locking screw thread formed in the nut member 16. All of the above-mentioned non-self-locking types of screw threads have the same pitch and it will be understood are right-hand threads.

The upper end of the clutch nut member 15 is provided with an outturned flange 15b between which and an inverted cup-shaped member 25 having an outside diameter substantially less than the inside diameter of the tubular body 10 are disposed a plurality of balls 25a which constitute a ball bearing. Thus, a definite limited amount of play is provided between the cup-shaped member 25 and the tubular body 10 as indicated at 25b.

As shown in FIG. 1, a spring 27 is interposed between the cup-shaped member 25 and the annular disc 19. This spring 27 in cooperation with the plurality of springs 26 is effective to normally bias all three pairs of clutch faces 14 and 15a, 13 and 17, and 19a and 18, into clutching contact one with the other.

While the brakes are released and the parts of the slack adjuster mechanism 3 occupy the position shown in the drawing, the clearance A shown in FIG. 1 between the contact ring or stop 22 and the guide pins 20, 20a corresponds to the normal clearance between the brake shoes and a member to be braked, such as a brake disc. This clearance can be easily adjusted or changed by adjusting the contact ring or stop 22 relative to the inturned flange 1a that is integral with housing 1.

A cup-like bearing piece 28, which is arranged coaxially about the spindle 23 and constitutes the second part of a two-part brake rod, has a ball-like guide ring 29 interposed between it and the hereinbefore-mentioned end cover 44b through which this bearing piece 28 extends to the exterior thereof.

A spiral-jaw clutch 33 is provided between the spindle 23 and the bearing piece 28, one set of jaws 30 being provided on the spindle 23 and the other set of jaws 31 being provided on the bearing piece 28. These jaws are normally biased into engagement one set with the other by a spring 32, the strength of which exceeds the strength of the hereinbefore-mentioned spring 12.

The bearing piece 28 has formed integral therewith a pair of trunnions 28a and 28b on which is pivotally mounted one end of a brake lever 28c.

The upper end of the housing 1 is closed by a cover 1c to which a control valve 34 is secured by any suitable means (not shown). This control valve 34 serves to control the supply and release of fluid under pressure to a pneumatically operated brake shoe wear-indicating device (not shown) and comprises an annular disc valve 35 normally spring biased against an exhaust valve seat 37 formed on a valve stem 36 and unseated from a supply valve seat 38.

A delivery passageway 39 in the control valve 34 is connected by a pipe (not shown) to the wear-indicating device and a supply passageway 40 is connected by a pipe (not shown) to a source of fluid under pressure. An exhaust passageway 41 is open to atmosphere.

A spring-biased operating stem 42 is pressed against the lower end of the valve stem 36. This operating stem 42 is carried in the spindle 23 which is provided with a projection or stop 43 that limits the upward movement of the operating stem 42 relative to the spindle 23.

When a brake application is effected, fluid under pressure is supplied to the upper side of the piston 4a via a passageway 2a which is connected by a pipe (not shown) to the brake cylinder port of the usual brake control valve provided on each railway car. This fluid under pressure is effective to move the piston 4a and piston rod 4 downward against the yielding resistance of spring 12 to rock, via the pins 7, 7a, the two-part brake lever 8, 8a about the pins 9, 9a (FIG. 2). This rocking of the lever 8, 8a is effective, via pins 11 and 11a, to move the tubular body 10 downward. It can be seen from FIG. 1 that the slack adjuster mechanism 3 is likewise moved downward. Consequently, the spindle 23, which is connected by the spiral-jaw clutch 33 to the bearing piece 28, moves downward to effect rocking of the brake lever 28c in the direction to force the brake shoes against the brake disc to cause a brake application.

Assume proper or normal brake shoe clearance between the braking surface of the brake shoes and the brake disc, which distance may be, as aforestated, the distance A shown in FIG. 1. Therefore, the braking surface of the brake shoes is moved into contact with the braking surface of the brake disc substantially at the same time as the guide pins 20, 20a abut the stop 22.

When it is desired to release the brake application, the fluid under pressure supplied to the upper face of the piston 4a is vented in the usual manner to atmosphere through the passageway 2a and the brake control valve of the car brake system, whereupon the force of the spring 12 acting on the non-pressure head 12a and the two-part socket member 6, 6a returns the piston 4a, lever 8, 8a and the slack adjuster mechanism 3 to the position shown in the drawing.

Assume that a brake application has been effected in the manner hereinbefore described, and that, during the brake application, the braking surface of the brake shoes wears away. As this wearing away of the braking surface of the brake shoes occurs, the fluid under pressure acting on the piston 4a is effective to cause further counterclockwise rocking, as viewed in FIG. 1, of the brake lever 8, 8a to thereby effect downward movement of tubular body 10, which movement is transmitted via clutch faces 14 and 15a, clutch nut member 15, spindle 23, spiral-jaw clutch 33, bearing piece 28 and brake lever 28c to maintain the braking surface of the brake shoes in braking contact with the braking surface of the brake disc and thus the braking force on this disc.

It will be remembered that at the time the braking surface of the brake shoes was moved into contact with the braking surface of the brake disc, the guide pins 20, 20a, which are integral with annular disc 19, were moved into abutting relationship with the upper side of stop 22. Therefore, it will be apparent from FIG. 1 that, as the tubular body 10, clutch nut member 15, nut member 16, spindle 23 and bearing piece 28 are moved downward in the manner explained above in response to the wearing away of the braking surface of the brake shoes, the external clutch face 18 on the nut member 16 is moved downward out of clutching contact with the internal clutch face 19a on the now stationary annular member 19. Subsequent to movement of the external clutch face 18 on nut member 16 out of clutching contact with the internal clutch face 19a on now stationary annular member 19, the spring 27 exerts a force via the cup-shaped member 25, balls 25a and flange 15b on the clutch nut member 15 which acts in an upward direction, as viewed in FIG. 1. This force is transmitted via external clutch face 15a on clutch nut member 15 to the internal clutch face 14 formed on the tubular body 10 which is being moved in a downward direction by the brake lever 8, 8a.

It will be noted from FIG. 1 that the springs 26 transmit a force to the nut member 16 via annular member 19c, outturned flange 16a and the balls therebetween, which force acts in an upward direction as viewed in FIG. 1, on the nut member 16. Therefore, as the tubular member 10 is moved downward by the brake lever 8, 8a the internal clutch face 13 on the inturned flange that is integral with the tubular member 10 is moved out of clutching contact with the external clutch face 17 on the nut member 16.

In view of the above, it is apparent that as the tubular member 10, clutch nut member 15, spindle 23, spiral-jaw clutch 33 and bearing piece 28 are moved downward to maintain the braking surface of the brake shoes in contact with the braking surface of the brake disc as the brake shoes wear away, the springs 26 are effective to cause the nut member 16 to rotate on the clutch nut member 15 to thereby increase the effective length of the spindle 23 as the brake shoes wear away.

Now let it be supposed that, subsequent to this wearing away of the braking surface of the brake shoes while the brake application was in effect, the brakes are released by venting fluid under pressure from the upper face of the piston 4a to atmosphere in the usual manner hereinbefore described.

As the brake lever 8, 8a is now rocked clockwise, as viewed in FIG. 1, by the spring 12 in response to the venting of fluid under pressure from the upper face of piston 4a, the tubular member 10 is moved upward to cause upward movement of bearing piece 28, spindle 23 and clutch nut member 15, so that the internal clutch face 13 on the inturned flange integral with the tubular body 10 is moved into clutching contact with the external clutch face 17 on the nut member 16, it being understood that the hereinbefore-mentioned rotation of the nut member 16 relative to the clutch nut member 15 by the springs 26 continued until the external clutch face 18 on the nut member 16 was moved into clutching contact with the internal clutch face 19a on the stationary annular member 19. The continued clockwise rocking of the brake lever 8, 8a subsequent to external clutch face 18 on the nut member 16 moving into clutching contact with the internal clutch face 19a on the annular member 19 will move this member 19 and the guide pins 20, 29 upward relative to the stop 22 until this member 19 and the tubular body 10 are returned to the position shown in FIG. 1.

The operation of the control valve 34 and the brake shoe wear-indicating device connected thereto will now be described.

As long as the wear of the brake shoes is less than a chosen amount, the valve stem 36 is held in the position shown by the operating stem 42 and a spring 43a interposed between the stem 42 and the spindle 23. In this position of the valve stem 36, the disc valve 35 is seated on exhaust valve seat 37 and unseated from supply valve seat 38 so that fluid flows from the source of fluid under pressure to the wear-indicating device via passageways 40 and 39 and the corresponding pipes (not shown) so that this device is maintained in the position to indicate that brake shoe wear is less than a chosen amount.

When the maximum permissible brake shoe wear has occurred, the slack adjuster mechanism 3 has operated to rotate the spindle 23 and move it downward, as viewed in FIG. 1, far enough for the flange on the lower end of the stem 42 to abut the stop 43 and thereafter move the stem 42 downward far enough for the springs to seat valve 35 on supply valve seat 38 and move exhaust valve seat 37 downward away from valve 35. The wear-indicating device is now connected to atmosphere via pipe and corresponding passageway 39, the port in disc valve 35 and exhaust passageway 40. When fluid under pressure is thus vented from the wear-indicating device, it moves to the position to indicate that the maximum permissible brake shoe wear has occurred.

In order to return the spindle 23 to its original position when installing new brake shoes, this spindle 23 is manually rotated by means of a wrench that may be placed on the hexagonal head 24, it being understood that the jaws of spiral-jaw clutch 33 slide one over the other against the yielding resistance of the spring 32 as spindle 23 is rotated by the wrench. By virtue of this slipping of the jaws of the spiral-jaw clutch 33, the bearing piece 28 is held secured against or prevented from rotating by means of the brake lever 28 which is connected thereto by the trunnions 28a and 28b.

Since the spring 32 is stronger than the spring 12, this insures that when a brake release is effected, the spiral-jaw coupling 33 maintains the connection between the spindle 23 and the bearing piece 28.

The present invention, which constitutes a slack adjuster mechanism arranged in parallel spaced-apart relation to a brake cylinder, provides a short and compact brake assembly enclosed within a single casing. The biasing of the internal clutch face 19a on the annular member 19 into clutching contact with the external clutch face 18 on the nut member 16 by means of the plurality of springs 26 arranged arcuately about the annular member 19 rather than by a single spring arranged coaxial with the member 19 enables the overall length of the slack adjuster mechanism to be shorter than it would otherwise be. The slack adjuster mechanism is easily accessible from the outside, as shown in FIG. 1. The hexagonal head 24 for manually letting out slack is provided at the lower end of the slack adjuster mechanism and the control valve 34 for the brake shoe wear-indicating device at the upper end.

The construction and operation of the manual slack let-out mechanism is very simple since only the spindle 23 is rotated in a reverse direction relative to the other parts of the slack adjuster mechanism.

Having now described the invention, what we claim as new and desire to secure by Letters Patent is:

1. A brake assembly for applying a braking force to a member to be braked, said assembly having a casing provided with a brake cylinder therein, and a piston operative in said brake cylinder and movable in opposite directions responsively to supply and release of fluid under pressure to and from a chamber at one side thereof, wherein the improvement comprises:
   a. an operating lever pivotally mounted adjacent one end on said casing and operatively connected adjacent its opposite end to said piston for rocking movement by said piston,
   b. a two-part brake rod movably supported on said casing for axial movement substantially in a straight line, one end of said rod having a pivotal connection with a brake lever, and
   c. a slack adjuster mechanism interposed between and operatively connected to said operating lever and one part of said two-part brake rod, said slack adjuster mechanism comprising:
   i. a triple clutch mechanism having:
      1. a tubular member pivotally connected adjacent one end to said operating lever intermediate the ends thereof and having at its opposite end an inturned flange on which is provided a pair of axially spaced clutch faces,
      2. a first nut member coaxially related to said tubular member and having a pair of axially spaced clutch faces, one of which cooperates with one of said clutch faces on said inturned flange,
      3. an annular member disposed in and having guide means for axial movement with respect to said tubular member and a clutch face which cooperates with the other of said clutch faces on said first nut member, and
      4. a clutch nut member having at one end an outturned flange on which is provided a clutch face which cooperates with the other of said clutch faces on said inturned flange, and having an external and an internal non-self-locking screw thread of different diameters,
      5. said first nut member and one part of said two-part brake rod having respectively internal and external non-self-locking screw threads of different diameter, whereby said first nut member is rotatably mounted on said clutch nut member, and said clutch nut member is rotatably mounted on said one part of said brake rod,
   ii. a stop on said casing disposed in the pathway of said guide means,
   iii. a plurality of spring seats carried by said annular member,
   iv. a pair of spring seats,
   v. a plurality of springs, each interposed between one of said spring seats carried by said annular member and one of said pair of spring seats,
   vi. another spring interposed between said annular member and the other of said pair of spring seats,
   vii. a pair of bearings disposed respectively between one of said pair of spring seats and said first nut member, and between the other of said pair or spring seats and said clutch nut member,
   viii. said plurality of springs being effective via one of said pair of bearings to cause rotation of said first nut member relative to said clutch nut member, while said pair of axially spaced clutch faces on said first nut member are disengaged, in response to further rocking of said operating lever in one direction subsequent to said guide means contacting said stop, until said other clutch face on said first nut member reengages said clutch face on said annular member, and
   ix. said another spring being effective via the other of said pair of bearings to cause rotation of said clutch nut member relative to said one part of said two-part brake rod while said clutch face on said clutch nut member is disengaged from said other clutch face on said inturned flange until said clutch faces reengage to increase the effective length of said one part of said two-part brake rod as said brake shoes wear.

2. A brake assembly, as recited in claim 1, further characterized in that said operating lever comprises two parts, each part being pivotally mounted adjacent one end on said casing and operatively connected adjacent its opposite end to said piston for simultaneous rocking movement by said piston.

3. A brake assembly, as recited in claim 1, further characterized in that said operating lever comprises two parts, and said tubular member is pivotally connected by a trunnion to said two parts of said operating lever intermediate the ends of each of said parts whereby rocking of said lever effects longitudinal displacement of said tubular member relative to said casing.

4. A brake assembly, as recited in claim 1, further characterized in that said plurality of spring seats carried by said annular member are arcuately arranged in spaced-apart relation on one side thereof, and the axes of said guide means and the axis of said tubular member lie in a common plane.

5. A brake assembly, as recited in claim 1, further characterized by a screw-threaded connection between said stop and said casing whereby said stop is adjustable relative to said casing.

6. A brake assembly, as recited in claim 1, further characterized in that said one part of said two-part brake rod extends through the other part to the exterior of said casing for receiving a tool to effect manual rotation thereof.

7. A brake assembly, as recited in claim 1, further characterized in that the two parts of said brake rod are connected by a spiral-jaw clutch whereby one part may be rotated in only one direction relative to the other part.

8. A brake assembly, as recited in claim 1, further characterized in that a ball-type guide member is interposed between said other part of said two-part brake rod and said casing.

9. A brake assembly, as recited in claim 1, further characterized by a control valve carried on said casing for controlling operation of a brake shoe wear-indicating device, and by means carried in and operated by one part of said two-part brake rod for effecting operation of said control valve.

10. A brake assembly, as recited in claim 2, further characterized by a piston rod carried by said piston and a ball and socket means connecting said piston rod to said two-part operating lever, said ball and socket means comprising:
   a. a ball member carried by said piston rod, and
   b. a two-part socket member, said two parts being carried respectively by said two parts of said operating lever.

11. A brake assembly, as recited in claim 7, further characterized by biasing means for normally effecting operation of said spiral-jaw clutch to provide a yieldable connection between said two parts of said brake rod.

* * * * *